(12) United States Patent  (10) Patent No.: US 8,477,992 B2
Paul et al.  (45) Date of Patent: Jul. 2, 2013

(54) DOCUMENT PROCESSING SYSTEM CONTROL USING DOCUMENT FEATURE ANALYSIS FOR IDENTIFICATION

(75) Inventors: Mark G. Paul, Raleigh, NC (US); Michael G. Boston, Ontario (CA); Roger Spitzig, Ontario (CA); David Rawlings, Ontario (CA); Walter S. Conard, Lake Villa, IL (US)

(73) Assignee: Bell and Howell, LLC, Durham, NC (US)

( * ) Notice: Subject to any disclaimer, the term of this patent is extended or adjusted under 35 U.S.C. 154(b) by 768 days.

(21) Appl. No.: 12/149,043

(22) Filed: Apr. 25, 2008

(65) Prior Publication Data

US 2008/0267510 A1  Oct. 30, 2008

Related U.S. Application Data

(60) Provisional application No. 60/951,640, filed on Jul. 24, 2007, provisional application No. 60/908,000, filed on Apr. 26, 2007, provisional application No. 60/980,621, filed on Oct. 17, 2007.

(51) Int. Cl.
 *G06K 9/00* (2006.01)
(52) U.S. Cl.
 USPC ............................................ 382/101; 382/209
(58) Field of Classification Search
 USPC .................................................. 382/100, 101
 See application file for complete search history.

(56) References Cited

U.S. PATENT DOCUMENTS 5,034,985 A 7/1991 Keough
5,204,681 A 4/1993 Greene
5,291,205 A 3/1994 Greene
5,581,257 A 12/1996 Greene et al.
5,673,338 A 9/1997 Denenberg et al.
(Continued)

FOREIGN PATENT DOCUMENTS

EP  0 459 792 A  12/1991
EP  0 525 427 A  2/1993
(Continued)

OTHER PUBLICATIONS

European Office Action issued in European Patent Application No. EP 08 008 025.5-2218 dated Dec. 12, 2009.

(Continued)

*Primary Examiner* — Shefali Goradia
(74) *Attorney, Agent, or Firm* — McDermott Will & Emery LLP

(57) ABSTRACT

The present subject matter relates to controlling of mail processing equipment. More specifically, the present subject matter allows for unique recognition of a printed document from all other similar documents, without the inclusion of additional purposeful identifying marks, data or barcodes. A document processing system, such as an inserter, printer, postage meter, sorter or other document processing system is controlled based on document identification which does not depend on unique identifiers. Similarly if a document is identified with a unique identifying mark on the first page, the present subject matter allows for identification of each subsequent page in the document without requiring identifying marks on each page. The identification data is then used to control the processing of the printed document based upon the recognition and enables the performance of quality checks. Further, each subsequent page in the document, as part of a quality check, can be verified without requiring identifying marks on each page.

33 Claims, 7 Drawing Sheets

U.S. PATENT DOCUMENTS

| | | | |
|---|---|---|---|
| 5,690,774 A | 11/1997 | Greene | |
| 5,891,240 A | 4/1999 | Greene | |
| 5,956,414 A * | 9/1999 | Grueninger | 382/112 |
| 6,170,744 B1 | 1/2001 | Lee et al. | |
| 6,230,143 B1 | 5/2001 | Simons et al. | |
| 6,471,878 B1 | 10/2002 | Greene et al. | |
| 7,231,082 B2 * | 6/2007 | Lenoir | 382/154 |
| 7,236,617 B1 | 6/2007 | Yau et al. | |
| 7,356,162 B2 | 4/2008 | Caillon | |
| 7,415,130 B1 * | 8/2008 | Rundle et al. | 382/101 |
| 7,489,807 B2 | 2/2009 | Hwang et al. | |
| 7,856,116 B2 | 12/2010 | Rodriguez et al. | |
| 2003/0138128 A1 | 7/2003 | Rhoads | |
| 2004/0255116 A1 | 12/2004 | Hane et al. | |
| 2005/0049744 A1 | 3/2005 | Mayer | |
| 2005/0063562 A1 | 3/2005 | Brunk et al. | |
| 2005/0069179 A1 * | 3/2005 | Hwang et al. | 382/124 |
| 2005/0123170 A1 | 6/2005 | Desprez et al. | |
| 2006/0108266 A1 | 5/2006 | Bowers et al. | |
| 2006/0159345 A1 | 7/2006 | Clary et al. | |
| 2007/0036470 A1 | 2/2007 | Piersol et al. | |
| 2007/0036599 A1 | 2/2007 | Piersol et al. | |
| 2007/0240198 A1 | 10/2007 | Kander et al. | |
| 2008/0002243 A1 | 1/2008 | Cowburn | |
| 2009/0218401 A1 | 9/2009 | Moran et al. | |

FOREIGN PATENT DOCUMENTS

| | | |
|---|---|---|
| EP | 0 700 853 A | 3/1996 |
| EP | 0 804 974 A | 11/1997 |
| EP | 1 953 703 A | 8/2008 |
| GB | 2 417 074 A | 2/2006 |
| WO | WO 2007/012814 A | 2/2007 |
| WO | WO 2007/028799 A | 3/2007 |

OTHER PUBLICATIONS

European Search Report issued in European Patent Application No. EP 08008024.5 dated Jan. 16, 2009.

European Search Report issued in European Patent Application No. EP 08008029.4 dated Jan. 21, 2009.

European Search Report issued in European Patent Application No. EP 08008025.2 dated Dec. 10, 2008.

Doermann, David, "The Indexing and Retrieval of Document Images: A Survey," Computer Vision and Image Understanding, Academic Press, US, vol. 70, No. 3, Jun. 1, 1998, pp. 287-298.

Agam, G. et al., "Content-Based Document Image Retrieval in Complex Document Collections," Document Recognition and Retrieval XIV, vol. 6500, Jan. 28, 2007, pp. 1-12, XP002509272.

Canadian Office Action issued in Canadian Patent Application No. 2,630,139 dated Jul. 20, 2011.

United States Office Action issued in U.S. Appl. No. 12/149,024 dated Apr. 28, 2011.

United States Office Action, issued in U.S. Appl. No. 12/149,024, dated Oct. 26, 2011.

United States Office Action, issued in U.S. Appl. No. 12/149,044, dated Feb. 22, 2012.

US Office Action issued in U.S. Appl. No. 12/149,024 dated Jul. 19, 2012.

United States Office Action issued in U.S. Appl. No. 12/149,044 mailed Nov. 16, 2012.

United States Office Action issued in U.S. Appl. No. 12/149,024 dated Jan. 7, 2013.

* cited by examiner

| | Account Number | Date Due | Page |
|---|---|---|---|
| 61 | 1234-54780 | 02/23/07 | 2 of 16 |

Summary for Your Name : 102-555-1234

50   60

Your Calling Plan (see pg 3)

Unlimited N&W Minutes

IN Calling Natl Unlim Pri

Unlimited monthly IN Calling minutes

Charges

| Monthly Access Charges | |
|---|---|
| Current Calling Plan 01/29 – 02/28 | 60.00 |
| | $60.00 |
| Wireless Surcharges | |
| Fed Universal Service Charge | 1.08 |
| Regulatory Charge | .05 |
| Administrative Charge | .40 |
| | $1.53 |
| Taxes, Governmental Surcharges and Fees | |
| IL State E911 Fee | .75 |
| IL State Telecom Excise Tax | 4.31 |
| Lindenhurst Mct | 3.69 |
| | $8.75 |
| Total Current Charges for 102-555-1234 | $70.28 |

Usage Charges

| Voice | | Allowance | Used | Billable | Cost |
|---|---|---|---|---|---|
| SharePlan | minutes | 700 (shared) | 134 | -- | -- |
| Promotional | minutes | | 1 | -- | -- |
| IN Calling | minutes | unlimited | 157 | -- | -- |
| Total Voice | | | | | $.00 |
| Total Usage Charges | | | | | $.00 |

View your bill and call details online for FREE. Log Into My Account at www.  s.com.

Detail for Your Name : 102-555-1234

Voice

63

| Date | Time | Number | Rate | Usage Type | Origination | Destination | Min | Airtime Charges | Long Dist/ Other Chgs | Total |
|---|---|---|---|---|---|---|---|---|---|---|
| 12/25 | 9:44A | 410-555-1234 | Peak | PlanAllow | Lake Vlk IL | Incoming CL | 0 | -- | -- | -- |
| 12/25 | 10:15A | 847-555-1999 | Peak | PlanAllow | Lake Vlk IL | Incoming CL | 15 | -- | -- | -- |
| 12/25 | 10:35A | 312-555-1689 | Peak | PlanAllow | Lake Vlk IL | Chicago IL | 4 | -- | -- | -- |
| 12/25 | 1:01P | 312-555-5889 | Peak | IN Allow | Lake Vlk IL | Northbrook IL | 21 | -- | -- | -- |

DOCUMENT PROCESSING SYSTEM CONTROL USING DOCUMENT FEATURE ANALYSIS FOR IDENTIFICATION

RELATED APPLICATIONS

This application claims the benefit of U.S. Provisional Application No. 60/951,640, filed Jul. 24, 2007 entitled "Document Processing System Control Using Document Feature Analysis for Identification", U.S. Provisional Application No. 60/908,000, filed Apr. 26, 2007 entitled "Apparatus, Method and Program Product for Identification of a Document with Feature Analysis" and U.S. Provisional Application No. 60/980,621, filed Oct. 17, 2007 entitled "Method and Programmable Product for Unique Document Identification Using Stock and Content," the disclosures of which also are entirely incorporated herein by reference.

TECHNICAL FIELD

The present subject matter relates to methods and systems for controlling mail processing equipment, and specifically, the controlling of document inserting systems based on control data that is specific to a document which is identified using a combination of non-unique document features.

BACKGROUND

Current high capacity inserting systems are capable of performing complex operations on the individual documents being processed. The number of pages per document varies from document to document, the number of inserts may vary from document to document and multiple input channels may need to be synchronized to enable efficient processing of the documents, i.e., adding a check to a statement. In order to perform these functions document factory operations require the addition of a unique identifier to every document. When quality demands dictate higher document integrity, unique identifiers may be added to every page so that the integrity checks can be extended to each page that makes up the document. The identifier must be unique and easily read by an imaging system or a barcode reader.

The extra step of adding a unique identifier to every document (and possibly every page) and tying it to the inserter control data represents significant additional work. In addition, most mailers do not want to add material such as one or more identifiers to the document that is not relevant to the information being communicated and perhaps unattractive or a distraction to their customers.

Hence a need exists for a method and system to uniquely recognize a printed document from all other similar documents without the inclusion of additional purposeful identifying marks, data or barcodes. Furthermore, there exists a need to enable a document processing system, such as an inserter, printer, postage meter, sorter or other document processing system to be controlled based on document identification which does not depend on unique identifiers. Similarly if a document is identified with a unique identifying mark on the first page, there exists a need to identify each subsequent page in the document without requiring identifying marks on each page. The identification data is then used to control the processing of the printed document based upon the recognition and enable the performance of quality checks.

In addition, there exists a need to identify each subsequent page in the document, for example as part of a quality check, without requiring identifying marks on each page.

SUMMARY

The teachings herein address one or more of the above noted needs.

One object of the present subject matter is to provide a document processing system for uniquely identifying a plurality of documents having minutiae associated with each of the plurality of documents. The plurality of documents are to be processed by document processing equipment. the system includes an image extraction module configured to receive an image captured from a post-print representation of the plurality of documents and extract image minutiae from the captured image for each of the plurality of documents. A minutiae data processing module is provided and configured to compare the minutiae associated with each of the plurality of documents with the extracted image minutiae for uniquely identifying each of the plurality of documents. A control processor is configured to execute document processing instructions associated with each uniquely identified document.

Another object of the present subject matter is to provide a method for controlling document processing equipment used to process at least one document having minutiae associated with the document. The method includes processing a printed representation of the document on document processing equipment, wherein the processing includes at least the capturing of an image of the printed representation of the document. Image minutiae is extracted from the captured image and compared with the minutiae for positively identifying the document. Control data associated with the document is utilized to control operation of the document processing equipment in response to positively identifying the document.

Yet another object is to provide a method for controlling document processing equipment. The method includes defining a super set of minutiae associated with each of a plurality of documents prior to processing on the document processing equipment. The super set of minutiae includes a plurality of minutiae candidates associated with each document which, in combination, provide positive identification of each document. A document minutiae database is generated for storing the plurality of minutiae candidates. Control data associated with each document is obtained by matching the stored minutiae candidates for each document with image minutiae obtained from an image post-print representation of each document loaded on the document processing equipment. The control data is applied to control the operation of the document processing equipment.

Still yet another object of the present subject matter is to provide a method for performing a quality check of a previously identified document that includes a plurality of pages. The method includes capturing an image of a printed representation of the document processed on document processing equipment. The image includes image minutiae for one or more pages of the document. Minutiae associated with at least one page of the document, that is subsequent to a first page of the document, is compared with associated image minutiae. The method includes verifying that the at least one page of the document is part of the document. The document is processed based on a result of the verifying step.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 shows an exemplary second page of an inserter document;

DETAILED DESCRIPTION

Figure 1:
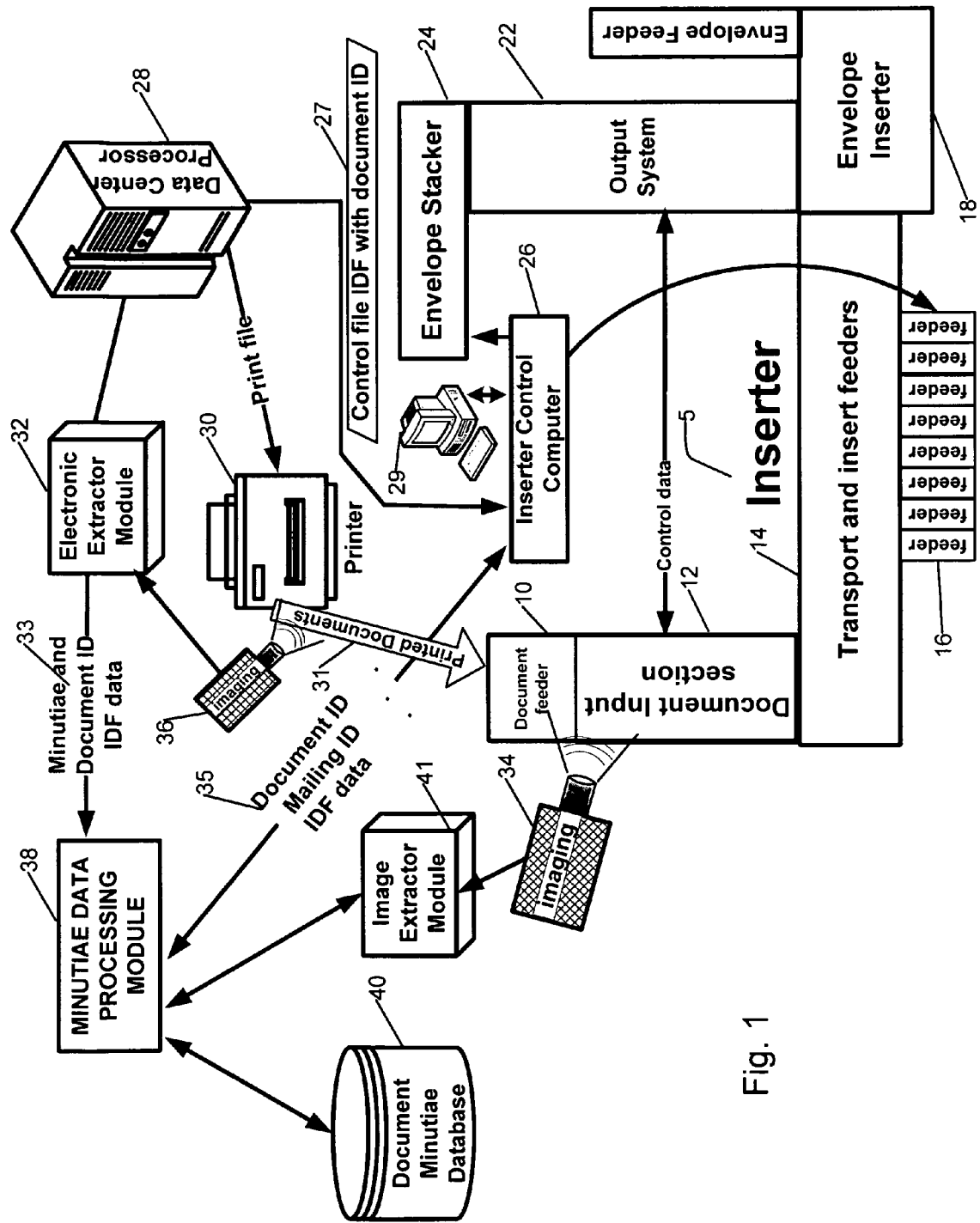
FIG. 1 is an exemplary functional block diagram of the overall system elements needed to perform document identification and inserter control.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The teachings herein alleviate one or more of the above noted problems through the usage of a document identification process that uses an electronic minutiae extraction module to collect minutiae from the electronic version of the document either at the document composition phase or from the print file. The print file is used to control the document printer. The extracted data is transferred to the minutiae data processing module for storing of the minutiae data associated with an identified document and accompanying pages in a document minutiae database. During run time of the inserter, the physical document is imaged and an image extractor module collects as many minutiae items as needed for positive identification against the minutiae stored in the database. A minutiae data processing module performs the comparison of the two sets of minutiae to obtain a match and sends the document identification to the inserter controller, where specific control functions for the document are processed by the inserter. The term database is used to indicate any type of searchable electronic data that is searchable by a computer and is not intended to be limited by the actual hardware or software implementation. Database storage may be implemented on disk storage such as DASD, RAID or stored in memory and the database file structure may be SQL, relational database or any satisfactory flat file structure. Those skilled in the art will select the combination of hardware and software according to the design implementation requirements and preferences needed to implement a database.

Document processing systems, such as an inserters, printers, postage meters, sorters or other document processing systems can be controlled based on a document identification process which does not depend on unique identifiers. The operation of the unique document identification process and the resulting control of a document processing system are explained in accordance with the operation of a document inserter. In addition to the document processing system control functions, the unique document identification may be used to store additional data into the data record for the specific documents being processed. This data is frequently referred to as metadata and may include but is not limited to time when processed, postage due, addressee and tracking data. This example is in no way intended to limit the use of this technique on other documents processing systems. The process of unique document identification on an inserter for the purpose of obtaining the correct inserter control data associated with processing the current document has two main steps. Step 1 involves extracting minutiae data associated with a specific document from an electronic format and associating the minutiae with the document. The resulting data is stored in a database for later processing. The stored data, referred to as the Unique Document Identifier (UDI) can have numerous formats and variable amounts of data. Typically the UDI will contain a document ID reference used of quick reference and data access, plus minutiae data used for document and page identification. In addition, metadata may be included which contains the inserter control data, mailing job ID and any other parameters that a person skilled in the art may find useful for the control application and for future observations of the document that may occur during its life cycle. Step 2 involves extracting the same minutiae data from an image of the document, then comparing the extracted minutiae to information in the database to obtain positive document identification. The document identification is used to access inserter control data needed to process the document. As explained below, the document identification is done without the benefit of any unique identification printed on the document. Identification of individual pages also is performed in a similar manner for page quality and integrity checks. The term "document" as used herein refers to one or more sheets. A sheet is defined as being made up of one or more pages. In the simplest case, a sheet includes a page on the front or a page on the front and back.

Reference is now made in detail to the examples illustrated in the accompanying drawings and discussed below. Referring to FIG. 1, a data center processor 28 is used to compose the documents that will form the mailing to be processed on the inserter. All of the features of the document that define the layout, format and content of the document are defined in the data center processor 28. Various electronic formats of the document may be generated by the data center processor, which may include a composition format using a tool such as Compose provided by SEFAS INNOVATION. The data center processor 28 may also re-compose print files into new formats with additional data added prior to generating the final print file which is used to control the printing of the documents that make up a document processing job. In addition, the data center processor 28 may generate documents of varying print file formats such as postscript, SOLscript, variable postscript (VPS), VIPP, Metacode, Advanced Function Presentation (AFP), Printer Control Language (PCL), enhanced metafile (EMF) or Hewlett Packard Graphics Language (HPGL), or XML. Of course, those skilled in the art may choose any number of available tools and print formats. Consequently, it will be recognized that skilled practitioners may choose to configure the data center processor 28 with various architectures in accord with their own application requirements, and that no limitations are implied by the examples herein. Similarly, the functional processing elements of the system (discussed in further detail later): electronic extractor module, data center processor, minutiae data processing module, image extractor module and document minutiae database, may be allocated to a single or to multiple computers or processors depending on the architecture chosen by those skilled in the art.

As shown in the exemplary depiction, the data center processor 28 interfaces to a document printer 30, the inserter control computer 26 and an electronic extractor module 32. The printer interface allows for the printing of the documents required for a specific mailing job 31, and specifically enables the documents to be installed on the document feeder 10 of inserter 5. Similarly, the interface to the inserter control computer 26 is used to provide the inserter control file 27, frequently referred to as the Inserter Data File (IDF), with the specific mailing job to be processed. Numerous inserter control files can be downloaded to the inserter control computer 26 in advance of processing a particular mailing job and the correct one selected when a mailing job is initiated through the operator interface 29. The control file 27 will contain the instructions needed for the inserter 5 to process each document in the mailing job, along with a document identification that can be used to reference the minutiae data associated with the same document in the document minutiae database 40. Alternately, the downloading of the IDF to the inserter control computer 26 can be eliminated if the electronic extractor module 32 includes the IDF data in the metadata associated with an UDI.

Figure 2:
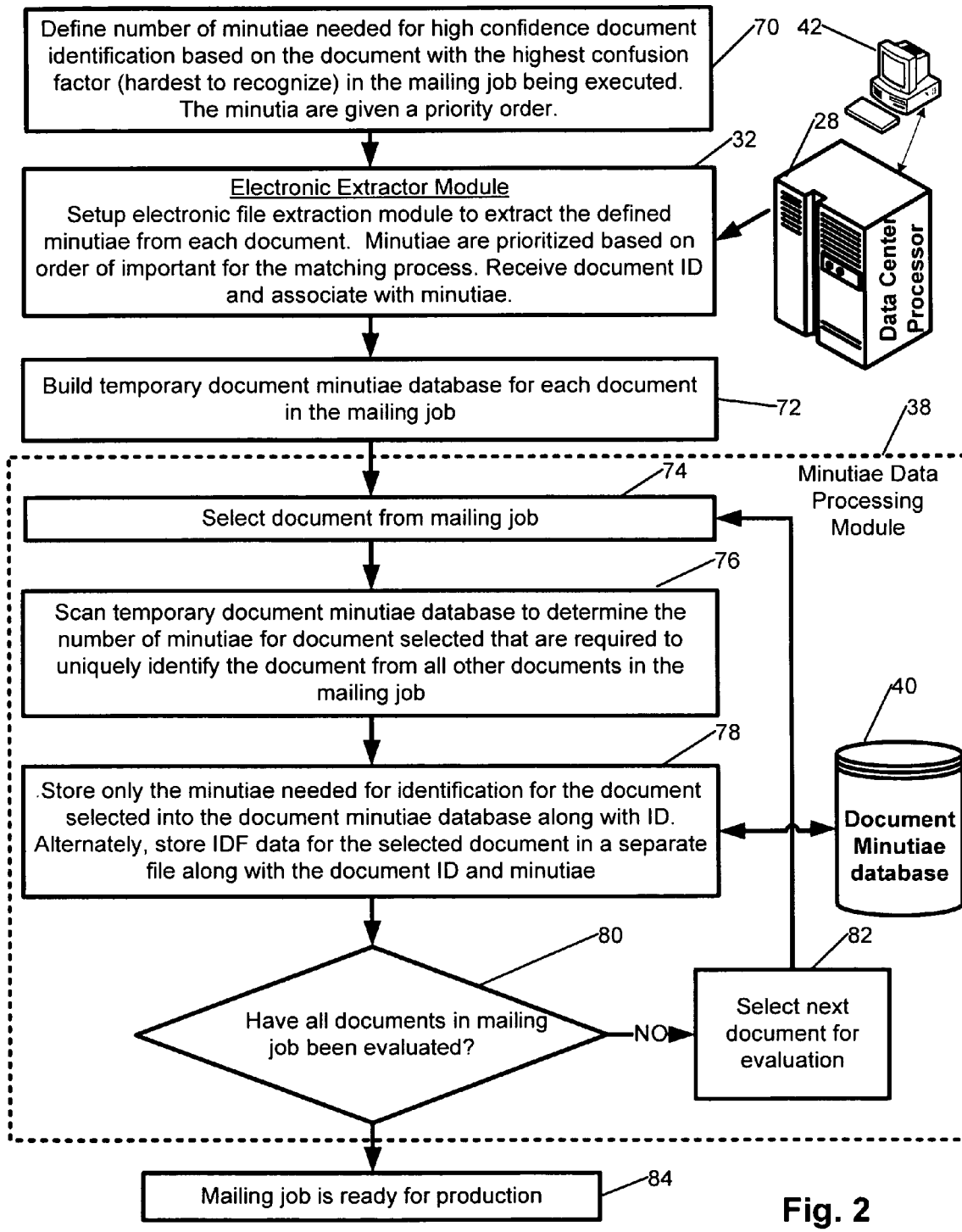
FIG. 2 depicts the exemplary processing steps required to collect document minutiae to be used for identification.
Figure 3:
FIG. 3 shows an exemplary first page of an inserter document.

The electronic extractor module 32 extracts the minutiae needed for later positive document identification. FIG. 2 provides the processing steps needed to extract the required minutiae and build the document minutiae database 40. The process is initiated by defining the number of minutiae needed for high confidence document identification versus all other documents in the job to be processed 70. The selection is based on a definition of sufficient minutiae to eliminate the possibility of confusing the document with other documents. Such confusion may arise when processing documents with similar layout, format and content, from errors inherent in image analysis such as optical character reader OCR errors and from issues with print quality such as ink density or dirt on the paper. Hence, a single minutiae is generally not sufficient for positive document identification. In addition, keeping with the teachings herein, no unique identification marks need be added to the document such as barcodes 58 or unique ID numbers 59 as shown in FIG. 3. The definition of the minutiae may be performed by a combination of automated analysis coupled with an operator interface 42. For example, an operator using a graphical user interface (GUI) to display page one of the document may select a minutiae item. Then the electronic extraction module 32 would search the remaining documents in the print file to see if this minutiae, in addition to other minutiae already selected, results in all documents in the job being uniquely distinguished from each other. This process would be continued until a super set of minutiae are identified. The super set of minutiae is the minimum number of minutiae needed to distinguish any two documents in the processing job, including accounting for errors such as OCR inaccuracy.

Referring to FIG. 1 the electronic extraction module 32 alternately may obtain the required minutiae data from an image of the printed document as it comes off the printer, by utilizing a camera 36 attached to the printer output. Prior definition of the features to extract such as minutiae items 50 through 63 on FIGS. 3 and 4 is required through operator selection with or without computer assistance. The electronic extraction module 32 extracts the minutiae items 50 through 63 from the image and combines the minutiae data with a document ID and metadata such as but not limited to IDF data. This data 33 is processed by the minutiae data processing module 38 and stored in the document minutiae database 40. Those skilled in the art may define additional alternatives for extracting and storing minutiae data prior to observation of the same data on a document processing system and obtaining the control data needed operate the document processing system.

Defining a super set of minutiae for a document is only required for a particular job type such as the exemplary monthly phone bill from a telephone utility. The process would not have to be repeated each month when the same bill is run again unless a change is made to the document format (e.g., data field locations are changed). The definition of super set of minutiae essentially represents part of the program that will be used by the electronic extraction module 32 to build the document minutiae database 40. The super set of minutiae will be assigned a search priority, which defines the order that minutiae candidates will be searched via the electronic representation of the document and later in the image representation of the document to either collect the minutiae or use the minutiae for identification.

Since document integrity and quality may be an integral part of this process, minutiae may also be extracted from each page that makes up a document. The amount of minutiae data extracted from each page is variable depending on the integrity requirements. For example if the integrity check only requires that the presence of all 16 pages of a 16 page document be verified then the page minutiae could be restricted to the page number for the simplest case. However, if every page must be identified uniquely from all other pages in the mailing job, a full set of minutiae will have to be extracted from the print file.

FIGS. 3 and 4 provide examples of the super set of minutiae as they would be extracted from an exemplary phone bill. The minutiae will be explained in priority search order; however those skilled in the art may choose different orders and different minutiae. First priority in this example is the company logo 57 since this will serve as a check that the correct documents were loaded on the inserter 5. Next in the search order are two minutiae that are at fixed locations on the document. The coordinates of this data are known in advance and do not change from document to document. The account number 50 is minutia that supports part of the document identification and the date 51 is a further check that the correct documents are being processed. Further minutiae may come from the address block 52, which is typically at a fixed location on the document so that the address block is visible through the envelope window (outlined with dashed lines 56).

Other minutiae may be floating on the document, which means the coordinates of the information are not known in advance since the location on the document is content driven, and hence, more or less lines of content may cause variation. The phrase, "Total Amount Due Feb. 23, 2007" 54, is an example of floating minutiae. In order to find the amount due, $137.09, the search algorithm must first find the phrase "Total Amount Due Feb. 23, 2007" 54 and then look for the amount data ($137.09) immediately to the right of the phrase. If the minutiae that is located on page one is not sufficient to uniquely identify the document to a very high probability, the minutiae processing will continue on to page two, as shown in FIG. 4. On page 2 the account number 50 and page number 60 may be identified as part of a quality check in addition to a fixed minutiae for name and phone number 61 plus two floating minutiae "Total Current Charges for 102-555-1234" 62 and details containing called numbers 63. For this example, nine minutiae (57, 50, 51, 52, 54, 60, 61, 62 and 63) were identified as the super set that are sufficient to uniquely identify any document in the mailing job.

Now referring back to FIGS. 1 and 2, the electronic extractor module 32 will extract the minutiae from the super set of minutiae in priority order from the electronic representation of the documents. Brute force algorithms, that analyze each element in the print file versus the selected minutiae, are used for the extraction process. A dividing algorithm, which is a form of brute force algorithm also may be used, other algorithms will be used to enhance processing speed depending on the constraints applied to the extraction process. An exemplary first step is to have the electronic extractor module 32 extract and/or generate the minutiae super set from every document and optionally every page in the document and build a temporary document minutiae database 72 for every document and optionally every page in the document in the print file. The minutiae extracted from the electronic file may contain all the data necessary to recognize the same minutiae when an image of the document is processed. The minutiae as stored may include, but is not limited to, content, font, pitch, coordinates of the area of interest on the document and key phrases needed to locate floating data on the document. In addition, logos or other images (represented as JPG, TIFF, BMP, EMF or other format) maybe included as minutiae. This temporary database need not be maintained long term since it is larger than needed for unique document identification for each document. Subsequent pages in a document will be processed in a similar manner by the electronic extractor module 32 to extract the minutiae required for page quality and integrity verification. The electronic extractor module 32 may receive a unique document ID from the data center processor 28 for the document once processed or it can assign the ID and send it back to the data center processor 28 for incorporation into the IDF 27. The document ID is an identification assigned by at least one of the processors in the system to be used to reference related records in multiple data files. Of particular advantage with respect to the teachings is that the document ID as assigned is not intended for printing upon documents as a unique document identification. Those skilled in the art may choose various approaches for assigning a document ID.

Typically a document ID needs to remain unique for at least 45 days to be sure the mailing job has been completed before the ID is reused. It is even possible to use hash algorithms to generate a unique document ID from the minutiae data. Working in conjunction with the extractor is the minutiae data processing module 38 that will build the document minutiae database 40 for the job being analyzed. Continuing with the two step example—where a temporary and a permanent database is employed—the minutiae data processing module 38 will select a document to be processed 74. The second step continues as an iterative process where the first minutiae in the priority search order is extracted and compared to all other entries in the temporary document minutiae database 40 to determine if a positive match is achieved with this minutiae. If no match is identified, the next minutiae in the priority order is extracted and compared to all other entries in the temporary document minutiae database to determine if a positive match is achieved with this minutiae plus the first minutiae 76. When a unique positive match is achieved by sequentially comparing minutiae in the priority order 78, only the minutiae required for the match are transferred to the document minutiae database 40 for use during document identification. As a result, the file saved in the document minutiae database 40 is as small as possible which reduces storage space and allows for faster matching of imaged minutiae with the database minutiae extracted from the print file.

In addition to the minutiae data, the document ID and if so desired, the IDF data for the document are stored in the document minutiae database 40 to form an UDI for each document. Storing the IDF data in this manner eliminates the need to transmit the control data 27 to the inserter control computer 26 before the job is processed. If all documents in the mailing job have not been evaluated 80 the next document is selected 82 and the process continues until all documents are evaluated and their corresponding data is stored in the document minutiae database 40. At this point the data is stored along with a mailing ID until the mailing job is ready to be processed on the inserter 84.

Figure 5:
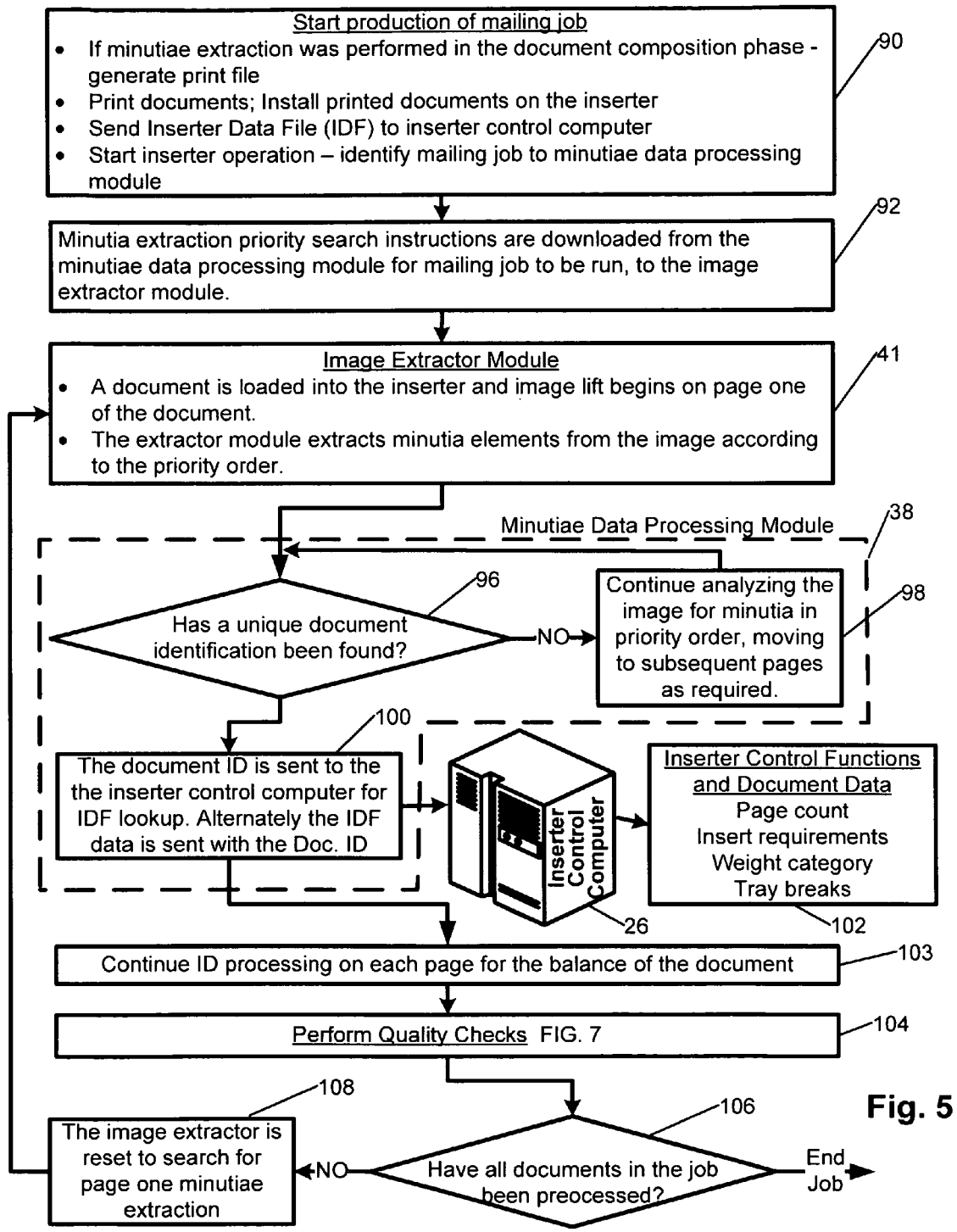
FIG. 5 depicts the exemplary processing steps required to identify a document using minutiae and to extract inserter control data plus perform quality checks.
Figure 6:
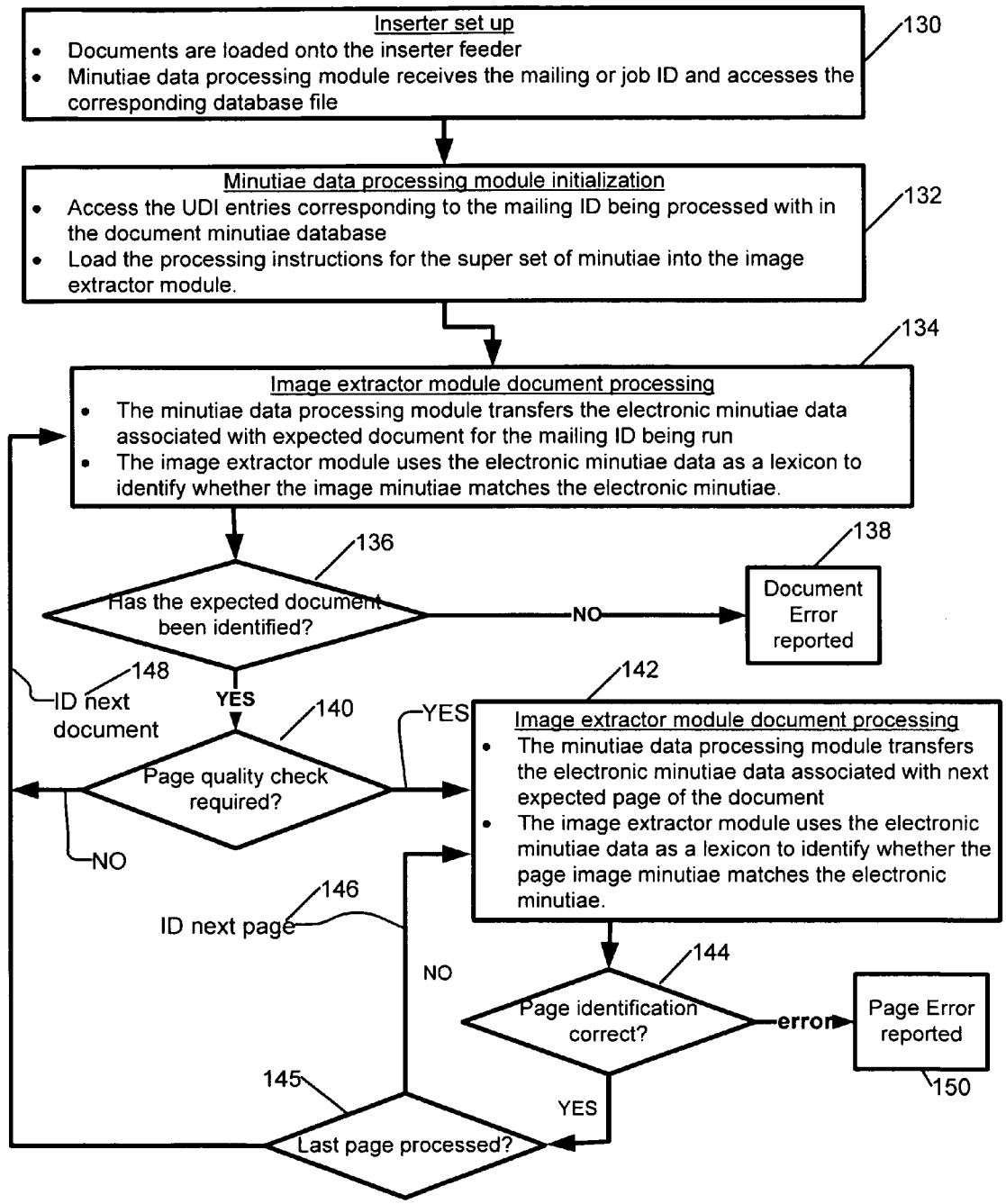
FIG. 6 shows an exemplary flow diagram of the steps involved in image processing enhancement for speed and accuracy.

Attention is now given to FIG. 5 which depicts a process for performing the production phase of the mailing job to produce the mail pieces that will be delivered. FIG. 1 also is referenced to identify system components. The start of production for the mailing job 90 includes several exemplary steps. As described previously, electronic minutiae extraction was performed on either the electronic files that represent the documents in the composition phase of production or after the composition document format has been converted to a print file format. If the print file has not been created, it must be generated and sent to the printer 30 to print the documents. The printed material is loaded on the inserter and the IDF control data 27 is downloaded to the inserter control computer 26. If the IDF control data is included in the metadata section of the UDI then the control file 27 is not required since the IDF data will be transmitted from the minutiae data processing module 38 after each document is recognized. The final startup step involves identifying the mailing job ID to the minutiae data processing module 38 so that the correct records can be accessed. As part of startup the minutiae data processing module will download the instructions needed by the image extractor module to locate each of the super set of minutiae 92. This data may include instructions on how to locate fixed areas of interest, data always located at fixed coordinates. Also included may be floating areas of interest, data found by locating key words or symbols, and the page number where the minutiae is located. Other parameters may be added by those skilled in the art.

The image extractor module 41 processes each document as it is presented to the inserter 14 by the document feeder 10. An image lift device 34 such as a camera or linear array scanner will capture an image of each page of the document as they appear. The lifted image is transferred to the image extractor module 41 where minutiae are extracted from the image using OCR and symbol recognition technology, such as required to recognize company logos 57. Other image processing techniques may be employed by those skilled in the art to enable improved recognition of minutiae and to reduce processing time for the image. The image extraction module 41 will pass the extracted minutiae to the minutiae data processing module 38 for minutiae analysis and matching against the document minutiae stored in the document minutiae database 40. The comparison step can be performed through use of decision trees, hashing and binary searches. The extracted minutiae are processed according to the priority order, moving to subsequent pages as required, until a unique document is identified, steps 96 and 98. The extraction process may be performed against the image as the page is scanned or performed against an image of a whole page. It is possible to have already extracted minutiae at the top of the page and perform the matching process before the whole page is scanned. Steps similar to this will be implemented in order to reduce processing time and reduce the amount of temporary storage required. The objective is to perform only the minimum amount of processing required to obtain a high confidence document identification.

A significant image processing enhancement can be realized by the image extractor module 41 receiving the minutiae data for a given document in advance, from the minutiae data processing module 38. This is possible since the order of the documents in the print file is known from the electronic extraction process. This enables the image extractor module 41 to know exactly which minutia it is trying to extract from the image and use this data as a lexicon for better read accuracy and processing speed. In addition, as a quality check, if the next document to be processing is not correct, the document processing should be stopped since a sequence error is indicated. Referring to FIG. 5, which is an exemplary flow diagram of the steps involved in image processing enhancement for speed and accuracy, the process starts with the inserter set up and initialization of the minutiae data processing module, step 130. The documents to be processed are loaded on to the inserter and the mailing ID or job ID that is use to set up the inserter is forwarded to the minutiae data processing module 38. The minutiae data processing module uses the mailing or job ID to locate the corresponding minutiae data file which contains all of the UDIs for the job that is about to be run on the inserter. This data is stored in the document minutiae database 40. The minutiae data processing module initializes the Image extractor module 41 by accessing the UDI entries in the document database 40 that correspond to the mailing ID being processed. The instructions on how to locate each minutia in the superset are transferred to the image extractor module. This data contains the areas of interest within the image where minutiae can be located whether the minutiae are at fixed coordinates or are floating and are referenced relative to key works or symbols, step 132. Those skilled in the art will add additional parameters that are useful in the process of acquiring image minutiae when analyzing an image of the document pages. As mentioned above, the order of each printed document is known based on analysis of the print file. This enables the minutiae data processing module to forward the parameters associated with each minutia, which is needed to identify the document currently being processed, to the image extractor module prior to analysis, step 134. For example the extractor will be told what account number, name, phone number etc. to be identified from the image. This type of lexicon based analysis is much faster and more accurate than requiring the image extractor to read the image minutia and send the results to the minutia data processing module for comparison to all of the entries in the minutiae database for the current job. Of course this broad matching process is likely to be required after a jam since the next expected document may have been damaged. The inserter can be run at a slower speed until synchronization is reestablished between the expected electronic minutiae and the image minutiae. If the expected document is not identified 136 then a document error is reported, step 138. This error may require stopping production since the wrong documents may have been loaded on the inserter or the broad match process may be required to reestablish synchronization. Once a document has been recognized, the decision to do page quality checks can be made, step 140. If page quality is required the image extractor module will operate in a similar manner to document identification except that predictive minutiae data is used for each page, step 142. If a page identification error is detected 144 then a page error is reported 150. The page error may require an inserter stop or the document might be diverted and processing continued. If several page errors occur, stoppage and operator intervention is likely. If the last page in not completed for the document being processed 145 then page identification will continue 146. Once the last page is processed or page quality was bypassed, the identification process continues with document identification 148 until all documents associated with the mailing ID are processed.

FIG. 1 depicts the minutiae data processing module 38 interfacing with a single image extractor module 41, imaging 34 and inserter 5. However, those skilled in the art will recognize that a mailing job is frequently separated over multiple inserters depending on production requirements. Therefore the minutiae data processing module 38 may be interfaced to multiple inserter systems to handle multiple mailing jobs or a job split over multiple inserters. This architecture also enables quality checking of a mailing job that is run on multiple inserters.

Once positive identification of a document is achieved 100, the document ID is sent to the inserter control computer 26 where the IDF data is accessed and used to control the document input section 12 (cutters, accumulators, folders and synchronization of multiple input channels), the insert feeders 16, the output system 22 (meters) and the envelope stacker 24 (tray break marking). The IDF data will contain the features of the document such as page count, insert requirements, weight category and ZIP Code data 102. The inserter control computer tracks the movement of the envelope through the inserter including the transport 14 and envelope inserter 18 in order to ensure the correct operations are performed at each step in the insertion process. Numerous other functions of the inserter may be controlled using the IDF data depending on the complexity of the inserter configuration. As mentioned earlier, an alternative to the IDF control file 27 is to store the control and document data as metadata along with the document ID and minutiae in the document minutiae database as part of the UDI. In this case the IDF control data is passed directly 35 from the minutiae data processing module 38 to the inserter control computer 26 each time a document is identified.

Figure 7:
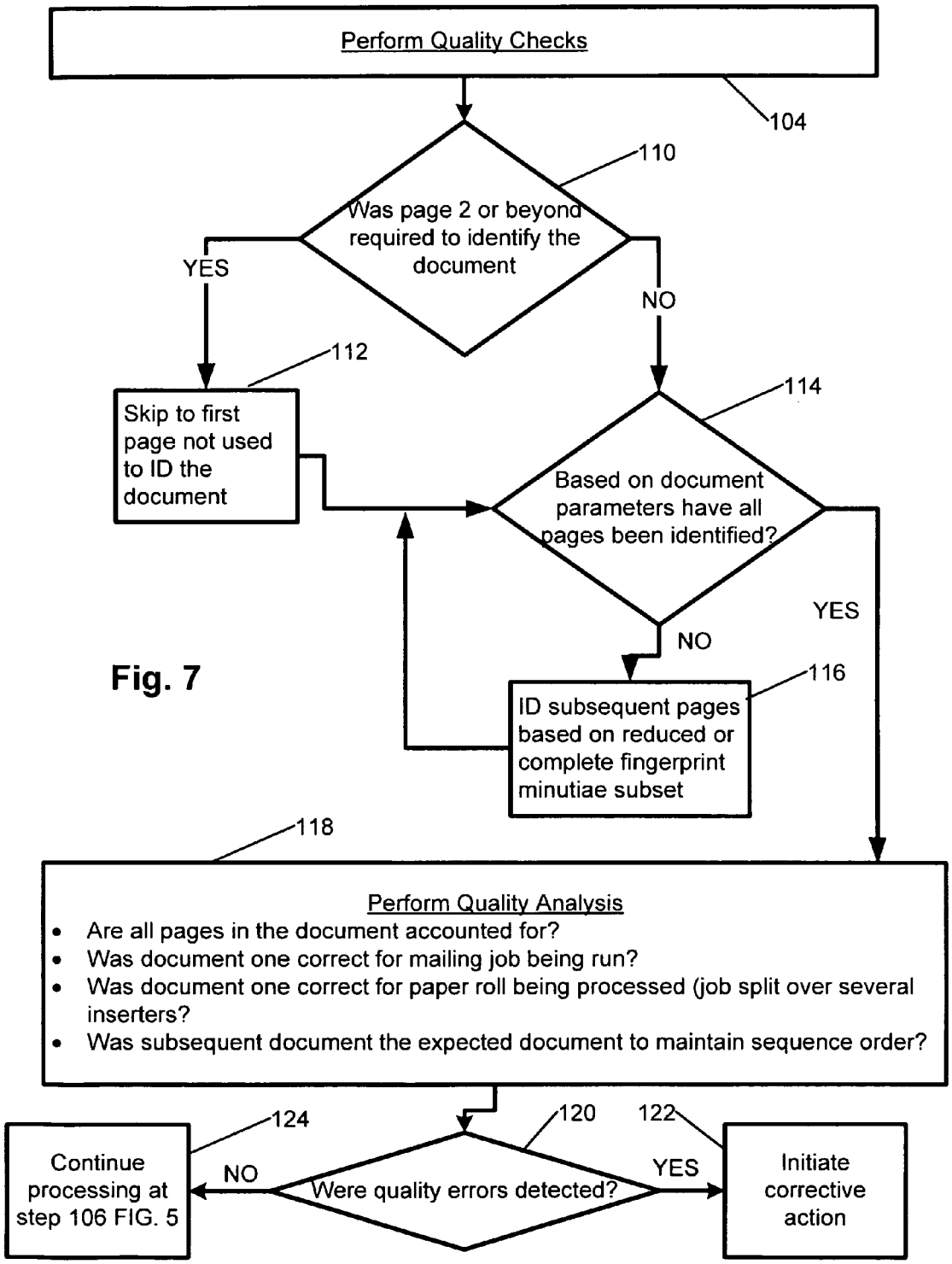
FIG. 7 depicts the quality and documents integrity process.

As previously mentioned, integrity checks of subsequent pages may be required. This necessitates continuing to identify the subsequent pages 103 using a reduced accuracy minutiae set or a complete set where high confidence unique ID of every page is needed. Document identification and page integrity enables additional quality checks to be performed 104. FIG. 7 provides expanded information on quality checks. If all the documents in a mailing job have been processed, step 106, the document job is ended and if not the image extractor module 41 is reset to look for the next document 108. As a practical matter, the image extractor module may be reset to look for the top priority minutiae as soon as document identification is made so that the processing load can be reduced by skipping extraction on subsequent pages if page integrity is not required 108.

Referring now to FIG. 7, quality checks 104 are an important aspect of full use of the document and page identification process. If page 2 or an additional page of a given document were required to make the document identification 112, then by default, each page used for the document ID has been identified. Therefore there is no requirement to do a separate page ID for these pages. Whether only page one or several pages were required to ID the document, it must be determined if additional pages must be identified 114 in order to perform a complete quality check. Since prior knowledge of each document's contents are known and stored in the metadata of the UDI and the image extractor module 41 knows in advance which document in the print sequence is being processed, the subsequent page processing 116 will continue until all pages are identified. Following the collection of all the required data by the image extractor module 41, the minutiae data processing module will perform a variety of quality checks 118. The quality checks may include but are not limited to verification that all pages in a document were accounted for and included in the insertion, that the correct mailing job is being run on the inserter, that the correct printed documents were loaded on the correct inserter for a mailing job which is split over multiple inserters and that all of the documents were manufactured in the correct sequence and are accounted for. For example, the mailing job document contents are known in advance, it is also known which document group, assuming that the mailing job will be divided over several inserters, should be on the inserter. By verifying that the first document is the correct first document for this inserter, errors in processing can be avoided that might impact production operations such as maintaining pre-sort order of the mailing pieces, which is required for postage discounts. Even the sequence of the documents, as they are processed, can be verified because the correct order of the documents is known in advance. For example, if a document identified as number "Two" did not follow document "One", where One and Two are part of the same mailing job, there is clearly a sequence error that requires corrective action. Numerous additional quality checks are possible since the document order is known before the image extraction is started and the order of the documents in the print file and document minutiae database are the same as the order on the printed material. If errors are detected 120, then corrective action is required 122. The range of corrective actions is extensive, but can include immediate stoppage of the inserter, operator notification, queuing the error for later action and ordering reprints. If no errors are detected, processing continues 124. Of course processing may continue even when certain errors are detected.

An alternative for subsequent page quality check, is to use feature analysis for identification of subsequent pages as described above when the document identification was performed by means other than using the minutiae data processing module 38 FIG. 5. The process flow of FIG. 7 remains the same where steps 103 and 104 FIG. 5 initiate the subsequent page quality checks. The subsequent page quality check process remains identical. Alternately, the document maybe identified by a required postal authority barcode, sequence number or document processing system control codes. Regardless of how the document was initially identified, complete document integrity is not confirmed without the verification of each page of the set of pages that form the document. Subsequent pages are still identified using the minutiae comparison technique on each page as disclosed herein. The need to identify each subsequent page in the document, for example as part of a quality check, without requiring identifying marks on each page, is met by the comparison to minutiae data for some or all of the pages whether the document is identified by a minutiae data analysis or by other means such as a barcode reading from one of the pages.

As shown by the above discussion, aspects of the document identification and inserter control system are controlled or performed by a processor/controller such as the data center processor 28 and the inserter control computer 26 or other processors needed for minutiae data processing module 38, electronic extractor module 32 and the document minutiae database 40. Typically, the processor/controller is implemented by one or more programmable data processing devices. The hardware elements operating systems and programming languages of such devices are conventional in nature, and it is presumed that those skilled in the art are adequately familiar therewith.

For example, the processor/controller may be a PC based implementation of a central control processing system. The exemplary system contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system also includes mass storage devices such as various disk drives, tape drives, etc. In operation, the main memory stores at least portions of instructions for execution by the CPU and data for processing in accord with the executed instructions.

The mass storage may include one or more magnetic disk or tape drives or optical disk drives, for storing data and instructions for use by CPU. For example, at least one mass storage system in the form of a disk drive or tape drive, stores the operating system and various application software as well as data, such as received collating instructions and tracking or postage data generated in response to the collating operations. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller 24. For example, the computer may include a graphics subsystem to drive the output display. The output display, for example, may include a cathode ray tube (CRT) display, or a liquid crystal display (LCD) or other type of display device. Although not shown, a PC type system implementation typically would include a port for connection to a printer. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network (to implement the desired processing).

The components contained in the computer system are those typically found in general purpose computer systems. Although illustrated as a PC type device, those skilled in the art will recognize that the class of applicable computer systems also encompasses systems used as servers, workstations, network terminals, and the like. In fact, these components are intended to represent a broad category of such computer components that are well known in the art.

Hence aspects of the techniques discussed herein utilize hardware and programmed equipment for controlling the relevant document processing as well as software programming, for controlling the relevant functions. A software or program product may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Terms relating to computer or machine "readable medium" that may embody programming refer to any medium that participates in providing code or instructions to a processor for execution. Such a medium may take many forms, including but not limited to non-volatile media, volatile media, and transmission media. Non-volatile media include, for example, optical or magnetic disks, such as any of the storage devices in the computer system. Volatile media include dynamic memory, such as main memory. Transmission media include coaxial cables; copper wire and fiber optics including the wires that comprise a bus within a computer system. Transmission media can also take the form of electric or electromagnetic signals, or acoustic or light waves such as those generated during radio frequency or infrared data communications. In addition to storing programming in one or more data processing elements, various forms of computer readable media may be involved in carrying one or more sequences of one or more instructions to a processor for execution, for example, to install appropriate software in a system intended to serve as the processor/controller 24.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A mail processing system for uniquely identifying a plurality of documents having minutiae associated with each of the plurality of documents, the plurality of documents to be processed by mail processing equipment of the mail processing system, the system comprising:
   an image extraction module configured to receive an image captured from a post-print representation of the plurality of documents and extract image minutiae from the captured image for each of the plurality of documents;
   a minutiae data processing module configured to compare the minutiae extracted from an electronic file associated with each of the plurality of documents with the extracted image minutiae for uniquely identifying each of the plurality of documents; and
   a control processor configured to execute mail processing instructions associated with each uniquely identified document processed by the mail processing equipment, wherein the minutiae and the image minutiae are a plurality of document characteristics, wherein:
   the plurality of document characteristics are selected from
      a combination of two or more of font, pitch, key word, numerical sequence, symbol, phrase and coordinates of an area of interest on the document,
   the document characteristics individually are insufficient to uniquely identify one of the plurality of documents from a second document, but the combination of the two or more document characteristics are sufficient to uniquely identify the one document from the second document, and
   the mail processing system is either an inserter system or sorter system.

2. The mail processing control system of claim 1, wherein the minutiae is stored in a database.

3. The mail processing system of claim 2, wherein the database is electronic data searchable by a computer.

4. The mail processing system of claim 2, wherein the database is configured to store the extracted minutiae for each document in a searchable format.

5. The mail processing system of claim 1, further comprising:
   an electronic extraction module configured to extract the minutiae from a printed representation of the plurality of documents.

6. The mail processing system of claim 5, wherein the electronic extraction module is configured to extract minutiae from either:
   a document composition phase of the document that defines the layout, format and content of the document; or
   a print file format which is used to control the printing of the document.

7. The mail processing system of claim 1, wherein each document is comprised of at least one sheet having printed material on one or both sides of the sheet.

8. The mail processing system of claim 1, wherein the captured image is captured by way of an image device coupled to the image extraction module.

9. The system of claim 1, wherein the minutiae data processing module is configured to perform one or more quality checks.

10. The system of claim 9, wherein the quality checks are selected from page count verification for each document, document sequence verification, and confirmation that printed documents were processed with correct mail processing equipment.

11. The system of claim 9, wherein the minutiae data processing module is configured to perform the one or more quality checks on at least one of the plurality of documents by comparing the extracted image minutiae from one or more pages of the document with corresponding minutiae associated with the document saved in a database.

12. The mail processing control system of claim 1, wherein the minutiae and the image minutiae are a plurality of document characteristics selected from font, pitch, key word, numerical sequence, symbol and phrase.

13. A method of controlling mail processing equipment of a mail processing system used to process one document of a plurality of documents, the one having minutiae extracted from an electronic file associated with the document, the method comprising the following steps:
   processing a printed representation of the document on mail processing equipment, the processing including at least capturing of an image of the printed representation of the document;
   extracting image minutiae from the captured image;
   comparing the image minutiae with the minutiae for positively identifying the document; and utilizing control data associated with the document to control operation of the mail processing equipment in response to positively identifying the document, wherein:

the minutiae and the image minutiae are a plurality of document characteristics, the plurality of document characteristics are selected from a combination of two or more of font, pitch, key word, numerical sequence, symbol, phrase and coordinates of an area of interest on the document, the document characteristics individually are insufficient to uniquely identify the document from a second document, but the combination of the two or more document characteristics are sufficient to uniquely identify the one document from the second document, and the mail processing system is either an inserter system or sorter system.

14. The method of claim 13, wherein the minutiae is obtained from either:
   a document composition phase of the document that defines the layout, format and content of the document; or
   a print file format which is used to control the printing of the document.

15. The method of claim 13, wherein the capturing includes using an image device for image capturing.

16. The method of claim 13, wherein the processing step includes capturing an image of one or more sheets of the printed representation of the document.

17. A system configured to execute the steps of claim 13.

18. A non-transitory computer readable medium embodying a program, wherein execution of the program causes a computer to implement the method of claim 13.

19. The method of claim 13, wherein the minutiae and the image minutiae are a plurality of document characteristics selected from font, pitch, key word, numerical sequence, symbol and phrase.

20. A method of controlling a mail processing system comprising:
   defining a super set of minutiae associated with each of a plurality of documents prior to processing on mail processing equipment of the mail processing system, the super set of minutiae including a plurality of minutiae candidates associated with each document which, in combination, provide positive identification of each document;
   generating a document minutiae database for storing the plurality of minutiae candidates extracted from an electronic file;
   obtaining control data associated with each document by matching the stored minutiae candidates for each document with image minutiae obtained from an image post-print representation of each document loaded on the mail processing equipment, and
   applying the control data to control the operation of the mail processing equipment, wherein:
   the stored minutiae and the image minutiae are a plurality of document characteristics, the plurality of document characteristics are selected from a combination of two or more of font, pitch, key word, numerical sequence, symbol, phrase and coordinates of an area of interest on the document, the document characteristics individually are insufficient to uniquely identify one of the plurality of documents from a second document, but the combination of the two or more document characteristics are sufficient to uniquely identify the one document from the second document, and
   the mail processing system is either an inserter system or sorter system.

21. The method of claim 20, wherein the applying step includes applying the control data to control operation of document mail processing equipment selected from the group consisting of an inserter, printer, postage meter and sorter.

22. The method of claim 20, further comprising the step of assigning a search priority to the super set of minutiae by defining an order in which the minutiae candidates will be searched in the minutiae database.

23. The method of claim 20, wherein the generating step includes extracting minutiae from one or more sheets of the document.

24. A system configured to execute the steps of claim 20.

25. A non-transitory computer readable medium embodying a program, wherein execution of the program causes a computer to implement the method of claim 20.

26. The method of claim 20, wherein the obtaining step further includes obtaining control data from a minutiae data processing module.

27. The method of claim 20, wherein the obtaining step further includes obtaining control data from an inserter control computer.

28. The method of claim 20, wherein the minutiae and the image minutiae are a plurality of document characteristics selected from font, pitch, key word, numerical sequence, symbol and phrase.

29. A method of performing a quality check of a previously identified document ("document") including a plurality of pages, the method comprising steps of:
   capturing an image of a printed representation of the document processed on mail processing equipment of a mail processing system selected from an inserter or sorter system, the image including image minutiae for one or more pages of the document;
   comparing minutiae associated with at least one page of the document which is subsequent to a first page of the document with associated image minutiae;
   verifying that the at least one page of the document is part of the document; and
   processing the document based on a result of the verifying step, wherein:
   the minutiae extracted from an electronic file and the image minutiae are a plurality of document characteristics, the plurality of document characteristics are selected from a combination of two or more or font, pitch, key word, numerical sequence, symbol, phrase and coordinates of an area of interest on the document, the document characteristics individually are insufficient to uniquely identify the document, but the combination of the two or more document characteristics are sufficient to uniquely identify the document.

30. The method of claim 29, wherein at least the first page of the document includes a unique identifier selected from a postal authority barcode, sequence number or a mail processing system control code for unique identification of the document.

31. The method of claim 29, wherein the verifying step comprises confirming the at least one page is in sequential order in the document.

32. The method of claim 29, wherein the processing step includes any necessary corrective action.

33. The method of claim 29, wherein the minutiae and the image minutiae are a plurality of document characteristics selected from font, pitch, key word, numerical sequence, symbol and phrase.

* * * * *